United States Patent
Bonard et al.

(10) Patent No.: US 6,216,929 B1
(45) Date of Patent: Apr. 17, 2001

(54) PROTECTIVE DEVICE FOR A BOTTLE INSTALLED ON A BICYCLE OR A SIMILAR VEHICLE

(75) Inventors: Yves Bonard, Geneva; Thomas Fodor; Philippe Moret, both of Nyon, all of (CH)

(73) Assignee: Lumberton International Inc., Panama (PA)

( * ) Notice: Subject to any disclaimer, the term of this patent is extended or adjusted under 35 U.S.C. 154(b) by 0 days.

(21) Appl. No.: 09/356,449

(22) Filed: Jul. 19, 1999

(30) Foreign Application Priority Data

Aug. 21, 1998 (EP) .................................................. 98810830

(51) Int. Cl.⁷ ........................................................ B62J 11/00
(52) U.S. Cl. ........................... 224/414; 224/428; 224/435; 224/443
(58) Field of Search .................................... 224/412, 413, 224/414, 428, 433, 435, 441, 443

(56) References Cited

U.S. PATENT DOCUMENTS

| | | | |
|---|---|---|---|
| 4,088,250 | * | 5/1978 | Schaefer .......................... 224/414 X |
| 4,312,465 | | 1/1982 | Sinkhorn et al. . |
| 4,386,721 | * | 6/1983 | Shimano .............................. 224/414 |
| 4,544,077 | * | 10/1985 | Rucker .............................. 224/414 X |
| 5,215,231 | * | 6/1993 | Paczonay .......................... 224/414 X |
| 5,238,160 | * | 8/1993 | Faulds ................................... 224/414 |
| 5,752,687 | * | 5/1998 | Lynch .............................. 224/414 X |

FOREIGN PATENT DOCUMENTS

| | | | |
|---|---|---|---|
| 4215793 A1 | * | 4/1923 | (DE) .................................. 224/32 R |
| 91 16 624 U | | 7/1993 | (DE) . |
| 551495 | * | 4/1923 | (FR) .................................. 224/30 R |
| 7-164947 | | 6/1995 | (JP) . |
| WO 92/19487 | | 11/1992 | (WO) . |

* cited by examiner

*Primary Examiner*—Gregory M. Vidovich
(74) *Attorney, Agent, or Firm*—Oliff & Berridge, PLC (57) ABSTRACT

A protective device designed to protect, from dirt and grind, a bottle held in a holder or cage fixed to a portion of a bicycle frame. The device comprises a cylindrical casing able to cover laterally, at least a top end of the bottle, and having a closed casing position and an open casing position; a lid which is able to close a top end of the cylindrical casing, and comprising a pivoting device permitting an opening of the lid from a closed lid position, when the cylindrical casing is in the closed casing position, to an open lid position; a sliding device disposable between the cage and the cycle; and wherein the cylindrical casing is able to have a sliding movement longitudinally along the sliding device, from the closed casing position where the top end of the bottle is protected to the open casing position thus giving access to the top end of the bottle.

27 Claims, 8 Drawing Sheets

PROTECTIVE DEVICE FOR A BOTTLE INSTALLED ON A BICYCLE OR A SIMILAR VEHICLE

The content of Application No 98810830.4 filed Aug. 21, 1998 in Europe is hereby incorporated by reference.

BACKGROUND OF THE INVENTION

1. Field of the Invention

The invention relates to a device designed to protect a bottle fixed to the frame or to any other part of a bicycle or similar vehicle The term bicycle or similar kind of vehicle is used to represent any pedal or motor-driven two-wheel vehicle such as a moped or a motorcycle. The term could equally apply to other types of pedal-driven vehicles having more than two wheels.

2. Description of Related Art

In past years it has become commonplace to equip bicycle frames with a holder or cage (hereafter referred to as the "cage") on or in which it is possible to fix a bottle allowing the cyclist to drink while riding. The cage or holder is usually fixed to the frame by two screws and has at least one component acting as a clamp to avoid the bottle coming loose when riding over bumpy terrain.

The major shortcoming of these systems is that the cap of the bottle which the cyclist, puts to his or her mouth to drink, is in no way protected from the dirt of the road. Thus, during a ride, the bottle and in particular its cap will be covered with dirt and dust requiring the cyclist to stop and clean the cap or try to clean it while riding, which may be dangerous. But of course even after wiping off the dirt from the bottle's cap macroscopically, chemical and organic contaminants are still present, which may represent a real health hazard.

SUMMARY OF THE INVENTION

Therefore an object of the invention is to propose a protective device for a bottle installed on a cage or holder on a bicycle or similar vehicle, thus avoiding the cap of the bottle to be covered with dirt during a ride.

A further object of the invention is to make the protective device user friendly, needing no complicated maneuvering on behalf of the cyclist to open or close the device and allowing the cyclist to remove and replace the bottle in its cage in a normal manner without hindering the cyclist's natural riding movements.

Another object of the invention is to allow the protective device to be installed and used with any type of existing bottle cage and bottle size. It should be possible to mount the device in any usual position and on any type of frame for any type of bicycle or similar vehicle.

Finally, the device has to be simple in design and not prone to malfunctioning, requiring no maintenance except for regular cleaning.

These different objects are fulfilled by the protective device described in the specification and claim 1. Three varying embodiments of the device are described in claims 8, 12 and 15. The dependant claims each describe the specific technical details of each embodiment. Claims 16 to 18 describe possible ways to market the device.

The other advantages of the invention are detailed in the following description which gives specific information on the three embodiments.

BRIEF DESCRIPTION OF THE DRAWINGS

This description should be read while referring to the enclosed drawings which contain the following figures.

DETAILED DESCRIPTION OF PREFERRED EMBODIMENTS

Figure 1:
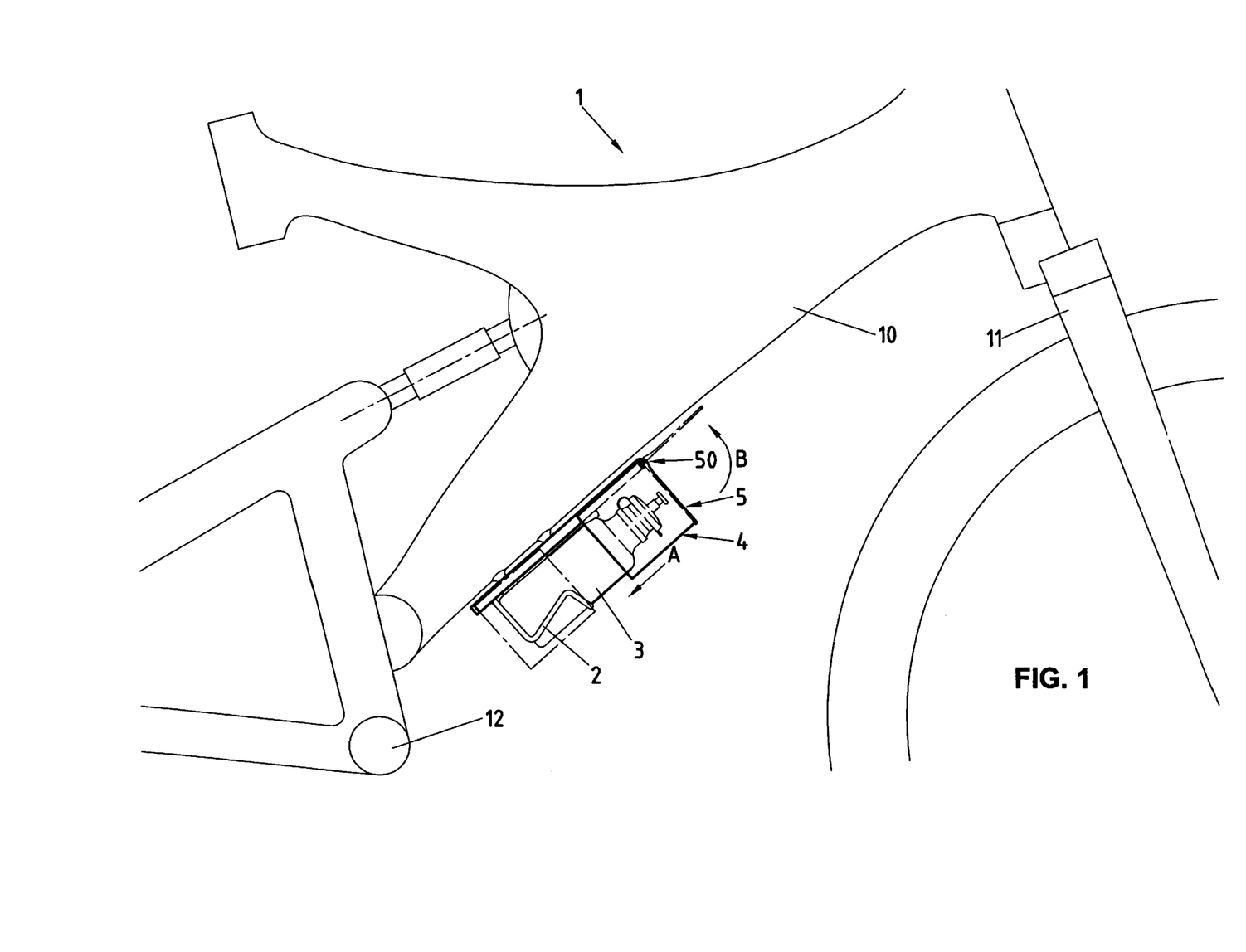
FIG. 1 shows a side-view of a part of a bicycle frame onto which have been installed a conventional bottle cage and the protective device according to a first embodiment of the invention.

Shown in FIG. 1 is, a part of a bicycle 1 more specifically a part of the frame 10 and a part of the fork 11 with the front wheel and the part of the frame which supports the pedals 12. The cage 2 contains a bottle 3 and is fixed, for example, using two screws onto the frame 10 preferably on the lower part which extends from the fork 11 to the pedals 12. On the type of bicycle shown, the cage 2 can only be fixed to that particular part of the frame. However on other types of bicycles, it could be fixed elsewhere.

The bottle 3 is kept in place by the clamp-effect of its cage 2 and can be removed and replaced simply by grasping it on it's lateral walls and sliding it in and out along the cage's longitudinal axis. FIG. 1 shows how little space is available to install and manipulate a protective device when the cage 2 is attached to the frame 10 between the cyclist's legs.

The protective device is generally made up of a cylindrical casing 4 and a lid 5. These two elements are shown here using a lateral view. The cylindrical casing 4 is slightly longer than the neck of the bottle but shorter than the bottle's total length. Its inner diameter is larger than the maximum diameter of the cage 2.

The cylindrical casing 4 is slidingly mounted relatively to the cage 2, as per arrow A, being able to take a first closed position—as shown by the bold lines on the figure, or a second open position—as shown by the dotted lines on the figure. The lid's 5 diameter is corresponding or slightly greater than that of the cylindrical casing 4 thus entirely enclosing the casing's opening when closed. The lid 5 is equipped with hinges means 50 allowing it to be opened in the direction of arrow B as shown by the dotted lines, or closed as shown by the bold lines.

By closed position of the cylindrical casing 4 and the lid 5, one understands a position in which these two elements cooperate to provide protection and cover for the upper part of the bottle 3 and in particular the bottle's cap. By open position, one understands a position in which these two elements allow for complete access to the upper part of the bottle and possibly an upper part of the cage, to enable the cyclist to remove and replace the bottle 3 from the cage 2 in the usual way without being hindered by any of these elements.

Figure 2:
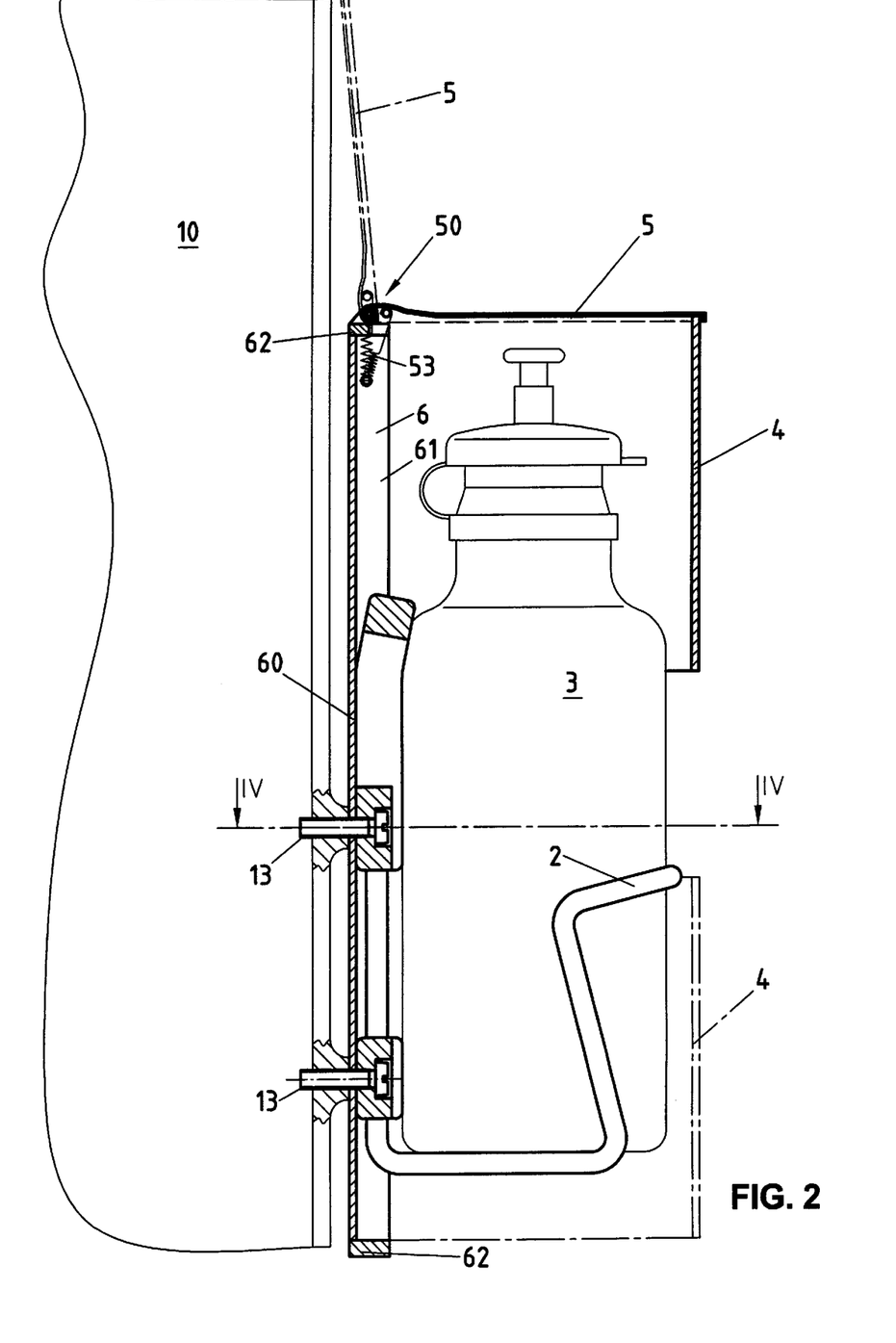
FIG. 2 shows an enlarged view of the cage and of the protective device according to the first embodiment of the invention.
Figure 3:
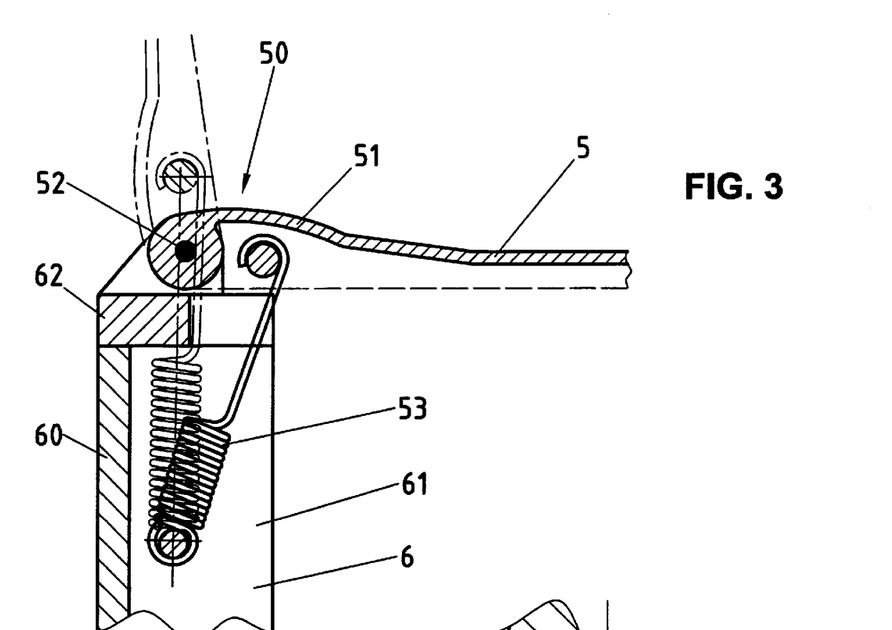
FIG. 3 is a partial sagittal cross-section view of the mobile lid's hinge from the first embodiment of the invention.
Figure 4:
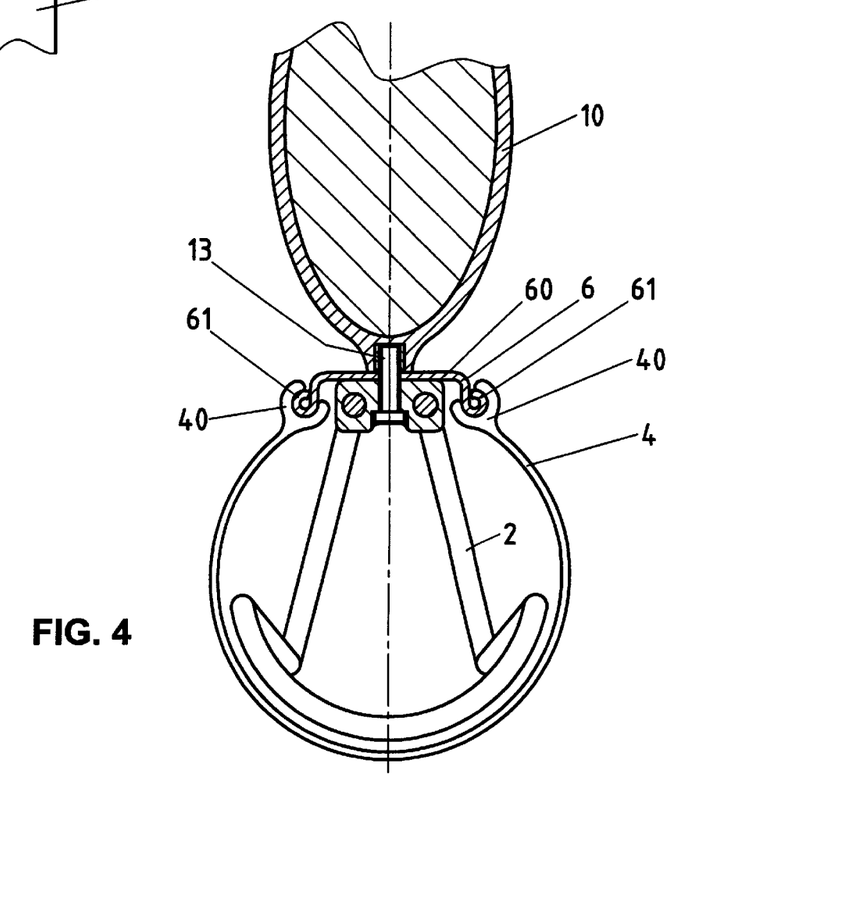
FIG. 4 is a transverse cross-section view shown at the level of line IV—IV of FIG. 2, the bottle being removed.

In the first embodiment—represented in FIGS. 2, 3 and 4, movements of the cylindrical casing 4 and lid 5 are independent of each other.

By examining FIGS. 2 and 4, one can see that the cage 2 is attached in a quite conventional fashion to the bicycle frame 10 using—for example—two screws 13 screwed into corresponding holes drilled into the bicycle's frame 10. A sliding rail 6 is simultaneously attached between the cage 2 and the frame using the same two screws 13.

As it can be seen from FIG. 4, the rail 6 is a lengthy U-shaped component. The central part of the U 60 is used for attachment and the two lateral wings 61 of the U are configured to accommodate for the sliding of the cylindrical casing 4.

For this purpose the cylindrical casing is split lengthwise and the resultant two edges 40 of the cylindrical casing are made in such a way as not only to fix the cylinder to the rail's lateral wings 61 but also to allow a sliding motion along them. Thus the cyclist can grasp the cylindrical casing 4 with one hand and slide it along the rail 6 from the closed position, shown by a solid line on FIG. 2 in which the cylindrical casing 4 encloses the neck and cap of the bottle 3 to the open position, shown by a dotted-line in FIG. 2 in which the cylindrical casing encloses the lower part of the bottle 3, giving access to the bottle's neck and cap. Stops 62 can be integrated into the device to limit the sliding of the cylindrical casing 4 on the rail 6 to only these two positions thus avoiding the cylindrical casing 4 from dislodging out of its rail 6 by accident. For this variant to be efficient, the cylindrical casing's 4 movement along the rail 6 should be greasy with a high drag—offering sufficient resistance so as not to move on its own along the rail 6 under the effects of the bicycle's vibrations.

The lid 5 is basically flat and circular in shape. Its diameter is at least equal to that of the external diameter of the cylindrical casing 4 thus completely covering the upper opening of the cylindrical casing 4. This is shown by the solid line on FIG. 2. An articulated component 50 fixed at the upper part of the rail 6 allows the lid 5 to be flipped from the closed to open position as shown by the dotted line in the diagram. A possible embodiment of this articulated component 50 is shown in detail in FIG. 3. On this example, the lid 5 has a lip 51 which extends to the guide-rail 6. The lip is designed to pivot around a hinge 52 which is attached to the top end of the rail 6 allowing the lid to be opened and closed. In the first variant, the pivotal movement of the lid 5 around the hinge 52 is sufficiently greasy to retain the lid in position on its own. In the second variant, the pivotal movement around the hinge 52 is much looser and the lid 5 is equipped with a retaining spring-mechanism 53 to keep the lid 5 in the open or closed position. This is possible since in the open position the spring's attachment is behind the hinge 52 and the lid's edge rests against the bicycle frame 10.

Therefore, when the protective device is closed, the bottle 3, specifically its neck and cap are protected against dirt by the cylindrical casing 4 which encloses those parts of the bottle 3 and by the lid 5 which covers the upper opening of the cylindrical casing. When the cyclist wants to use the bottle 3, he or she, with one hand simply flips open the lid 5, slides the cylindrical casing 4 down, then takes the bottle out of its cage 2 in the usual manner. Later the bottle can be put back in its cage 2 in the usual way, the cylindrical cover will be slid upwards and the lid 5 flipped to the closed position. All these operations can be carried out within the limited space available at that part of the bicycle's frame 10 without any risk of striking another part of the bicycle or the cyclist's legs. These operations can easily be carried out with one hand while riding.

Figure 5:
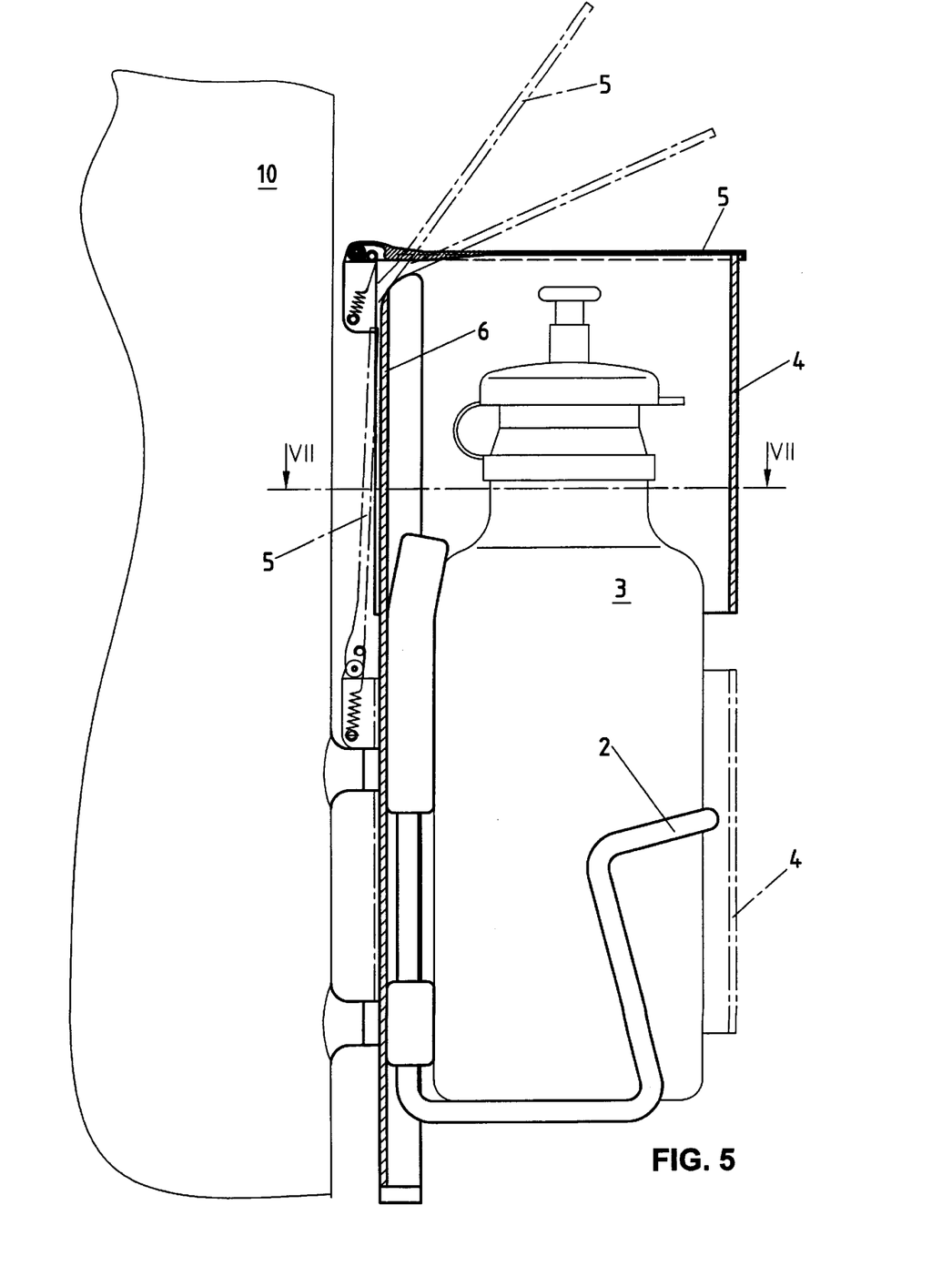
FIG. 5 is a similar view to FIG. 2 showing a second embodiment of the invention.
Figures 6, 7:
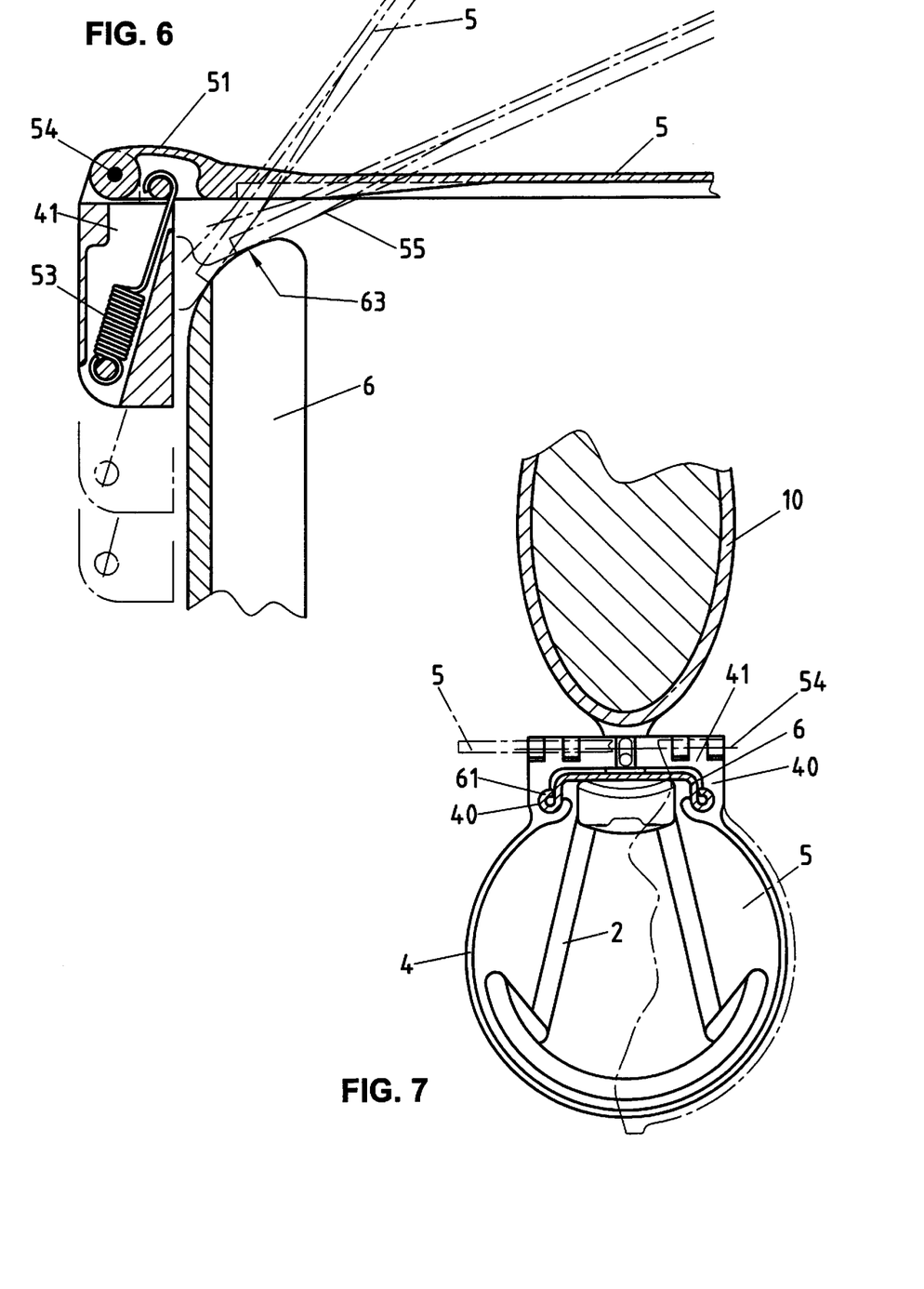
FIG. 6 is a partial sagittal cross-section view of the mobile lid's hinge of the second embodiment of the invention.
FIG. 7 is a transverse cross-section view at the level of line VII—VII of FIG. 5, the bottle being removed.

A second embodiment of the protective device is illustrated in FIGS. 5, 6 and 7. In this embodiment, the movement of the lid 5 is governed by the movement of the cylindrical casing 4

As illustrated in FIG. 7, the cylindrical casing 4 is closed around the rail 6 by a rear-piece 41 situated between the two edges 40 by which the cylindrical casing is fixed and is able to slide along the lateral wings 61 of the rail 6. In FIG. 6, the lid 5 is attached by its lip 51 around the hinge 54, which is attached to the rear part 41 of the cylindrical casing 4. The retaining spring 53 is maintaining the lid in the closed position. In this embodiment, the upper edge of the guide-rail 6 has a rounded and convex-shaped profile 63.

Thus, when the cyclist slides the cylindrical casing 4 downwards, the lower inner aspect 55 of the lid 5 slides along the convex-shaped profile 63 while the rest of the device is moving downwards. As seen in FIG. 6, the lid 5 then opens automatically and as shown in FIG. 5, in the open position, the lid 5 rests in the free space which is provided between the rail 6 and the bicycle frame 10. To close the device, the cyclist simply has to slide the cylindrical casing 4 back to its original position and the lid 5 will move back over the convex-shaped profile 63 and close with the help of the retaining-spring 53. In this variant, if the cylindrical casing's 4 sliding movement is greasy, it is preferable to allow a freer movement of the lid 5 on its hinge 54.

This embodiment is described using a convex-shaped profile 63 which allows the lid 5 to flip open automatically. Other forms of profile or other means of opening the lid can of course be developed.

Figure 8:
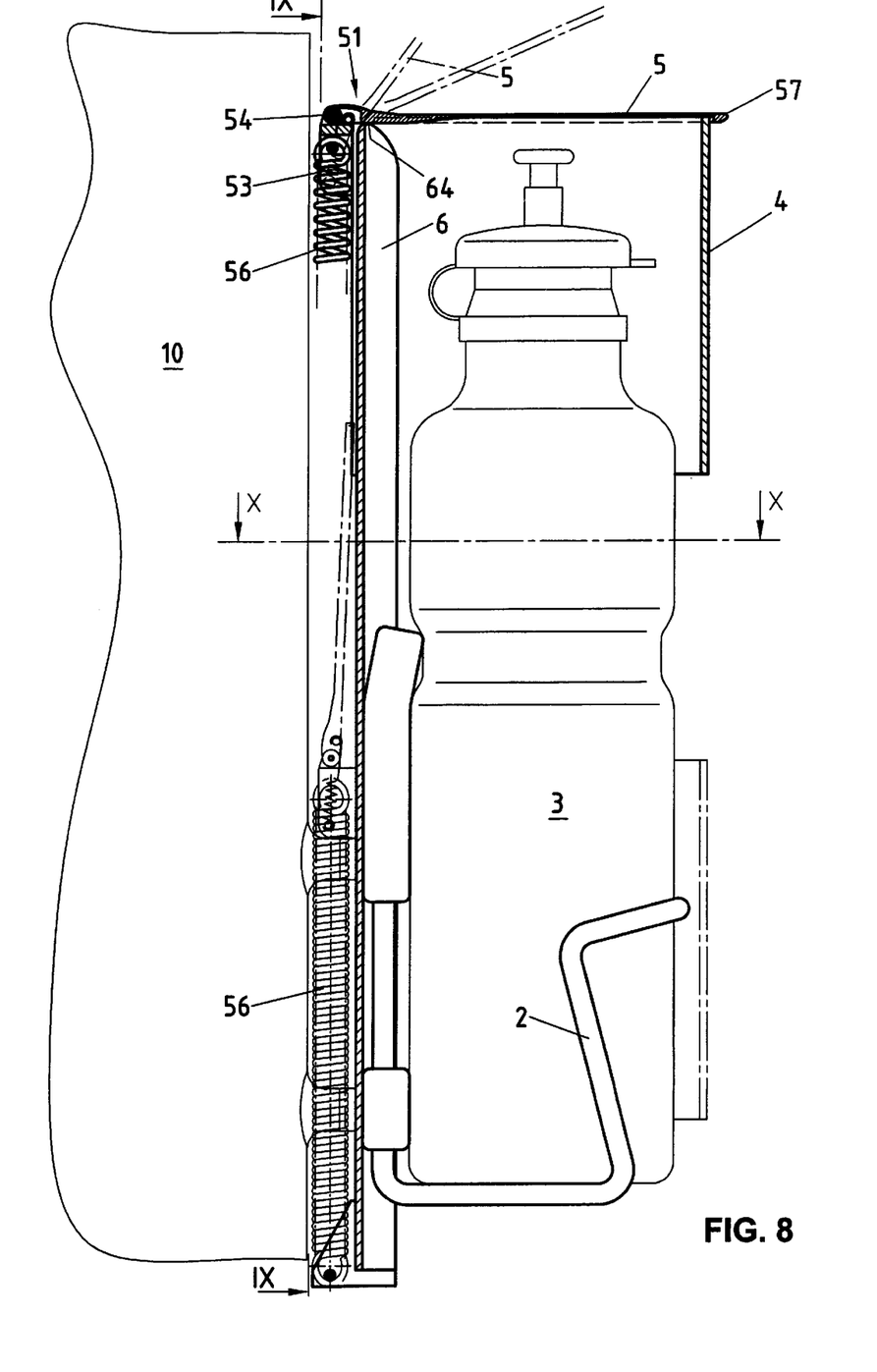
FIG. 8 is a similar view to FIGS. 2 and 5 showing a third embodiment of the invention.
Figure 9:
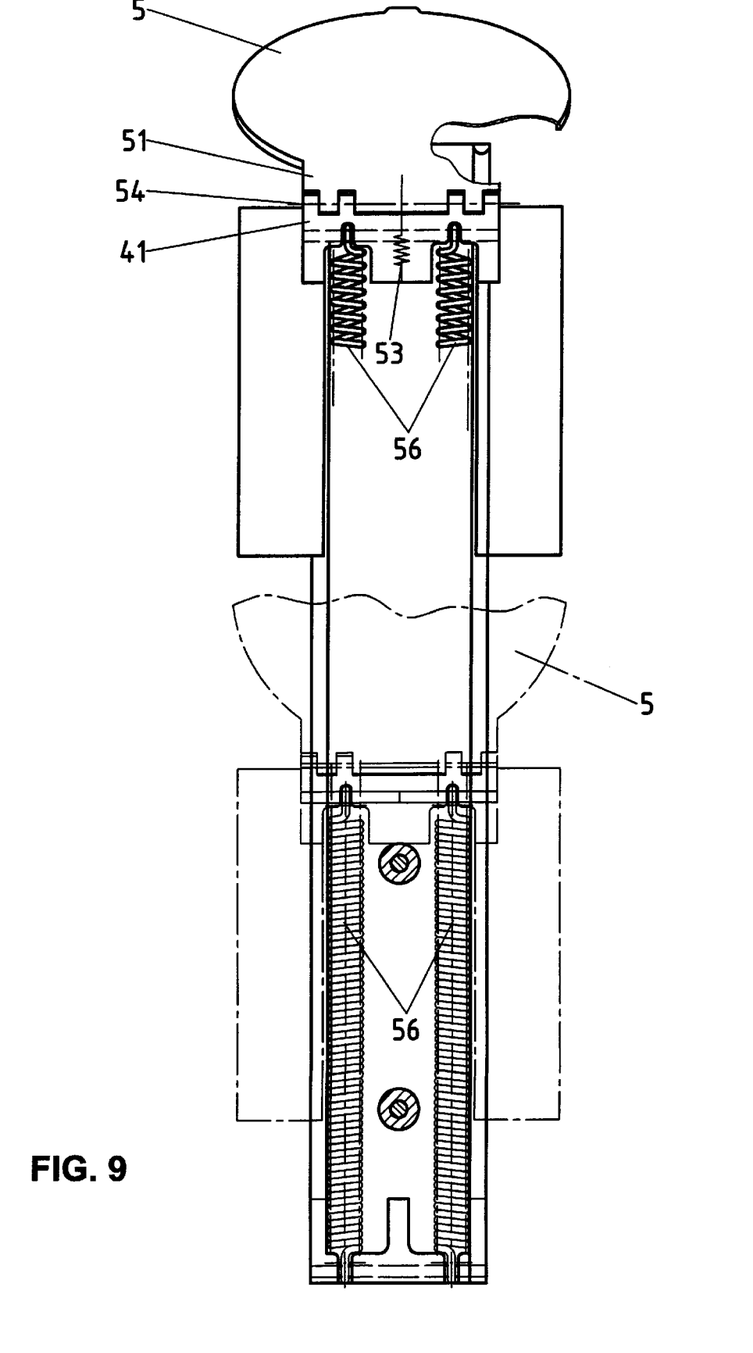
FIG. 9 is a rear-view following line IX—IX of FIG. 8.
Figure 10:
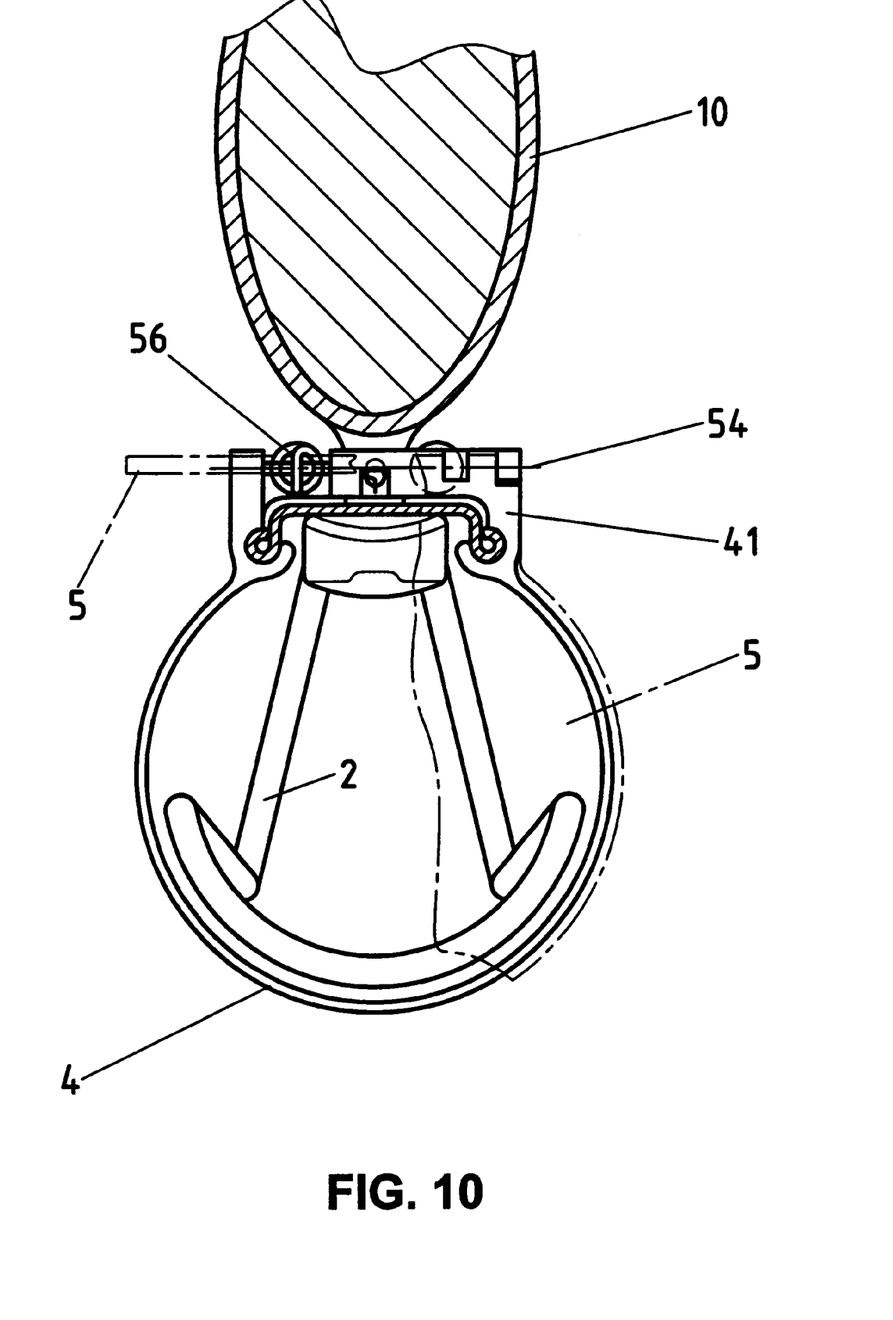
FIG. 10 is a transverse cross-section view at the level of line X—X of FIG. 8, the bottle being removed.

A third embodiment of the protective device is represented in FIGS. 8, 9 and 10. In this embodiment, the movement of the cylindrical casing 4 is governed by the movement of the lid 5 itself.

As illustrated in these figures, the lid 5 is mounted in the same way as in the previous embodiment, ie: the lip 51 pivots around the hinge 54 which is attached to the rear part 41 of the cylindrical casing 4. A spring loaded device, for example the retaining spring 53, will maintain the lid 5 in the closed position. The whole device is then moved downwards by the springs—represented in the diagram by two heavy-duty springs 56 which are attached to the rear part 41 of the cylindrical casing and also to the lower end of the guide-rail 6. The upper part 64 of the rail 6 is shaped in order to have an adequate profile or ridge of it's superior aspect, thus avoiding the accidental opening of the lid 5 due to jolting or other sudden movements of the bicycle.

With this embodiment, the cyclist can open the device by slightly pushing the lid's edge 57 causing the rear part of the lid 51 to leave its resting position on the top 64 of the rail which allows the whole device to be pulled downwards, thus completely opening the lid 5 and lowering the cylindrical casing 4 to which the lid 5 is attached, downward movement which originates from the action of the heavy-duty springs 56. To close the device, the cyclist grasps the cylindrical casing 4 and returns it to its initial, closed, position which stretches the heavy-duty springs 56 and closes automatically the lid due to the action of the retaining spring 53.

Therefore, the use of this embodiment of the device is extremely simple since the bottle can be exposed by simply lifting very lightly the lid's edge 57, all other movements being done automatically. Similarly, closing the device is simply a matter of bringing the cylindrical casing 4 back to its original position—thus allowing the lid 5 to close automatically.

In this variant the sliding of the cylindrical casing 4 on the rail and the pivoting action of the lid 5 around the hinge 54 should be relatively free.

As for the previous embodiment, any method other than the one described for the top-end 64 of the guide 6 can be used to avoid the accidental opening of the lid 5. Moreover, any spring mechanisms could be protected from dirt by a hood or a sleeve which would stretch over the spring. These additional features are not shown on the diagram for reasons of clarity.

From this embodiment, another could be developed in which the opening and or closing of the device would be governed by a button or lever fixed either on the device itself or on another part of the bicycle—for example the handle-bars.

FIG. 8 shows a bottle 3 of a different shape than those represented in FIGS. 1,2 and 5. This is merely to illustrate that any of the embodiments can work with bottles of any kind and shape which are commonly used with bicycles. In FIG. 8, the bottle is longer than those in the other diagrams. A rail 6 appropriately longer is all that is needed to accommodate this kind of bottle. The middle section 60 of the rail 6 should preferably comprise a lengthwise slit rather than simply two screw holes 13, thus allowing for positioning of the device to be easily adapted to the frame 10 according to the length of the bottle.

The figures show a single type of bottle holder or cage 2. Obviously the device can be adapted to any type of holder or cage 2 exposing the upper part of the bottle. The only constraint is that the cylindrical casing 4 be able to slide over the holder or cage.

The device must be light enough not to add too much extra weight to the bicycle and must be sufficiently resistant to stand up to constant use and knocks. While the spring mechanisms should be made out of metal, the other elements can be either made out of metal or synthetic materials. The material used for components that move relative to each other; the edges 40 to the rail's lateral wings 61, the lip 51 to the hinges 52 or 54, or the hinge on the upper part of the rail 6 or on its rear part 41, should be designed in order to allow whatever movement they must perform whether it be in a greasy or loose fashion without needing lubrication.

The device should ideally be easy to de-assemble for cleaning. Thus in all embodiments, one of the stops 62 could be removable or able to be clicked into place allowing the cylindrical casing 4 to be removed altogether.

Various design details have been described for each of the embodiments of the device. Obviously other design features can be integrated to the device. An example would be a means of maintaining and sliding the cylindrical casing 4 on the rail 6 in a different manner to that described above. Another example might be the re-design of the spring mechanism in the third embodiment—one spring 56 and two springs 53 for example.

Various designs of the cylindrical casing 4 can also be imagined. First of all, the open position has been described as being limited so that part of the bottle 3 and cage 2 remain covered by the cylindrical casing 4 when in that position. In the case of a cage 2 requiring not a lengthwise movement to remove the bottle but a sideways movement, the sliding elements and stop of the device can be designed in such a way as to completely expose the bottle when opened thus allowing access as required by the cage. Moreover, the length of the cylindrical casing 4 is not specified. The length can be whatever value is needed as long as the upper part of the bottle and its cap 3 are protected. The casing can be longer than the one represented in the figures and may cover a greater portion of the bottle's body. As a variation, it would also be possible to extend the cylindrical casing 4 on the opposite end to the lid 5 by using a flexible wrinkled-type cover, one end of which would be attached to the lower end of the cage 2 thus providing a more complete protection for the bottle. In this embodiment, the cylindrical casing 4 could simply be formed by a ring, sliding over the top of the bottle and of a flexible wrinkled-type cover attached both to the ring and to the lower end of the cage 2.

The design variations mentioned here are not the only ones that can be developed.

The whole protective device has been described as an add-on accessory to an existing bottle and cage. It would be equally feasible to design a protective device directly integrated to the cage with the same functional qualities as those described above.

The protective device as it is proposed here perfectly fulfils the aims set out for it. It efficiently protects the upper part of the bottle from dirt and grind, it is very easy to use for the cyclist who can access it while riding. It does not require complicated maneuvering and is adaptable to all kinds of bicycles and bottle cages and can be mounted on any part of a bicycles frame. Above all, its use does in no way hinder the cyclist's movements since at no time is any part of the device in the way of the cyclist's leg movements. The device is simple in design and therefore unlikely to suffer from malfunctioning. It is easy to clean and requires no other maintenance.

In the previous description, the cage and the device are assumed to be mounted on the bicycle frame. Nothing stops the device from being fixed to a different part of the bicycle with adequate fittings, for example, the handlebars, the front fork or behind the saddle. In addition to this, the invention is described as being a single bottle-holder and device. Obviously, the bicycle could be equipped with more than one device either separately or together on a double-bottle holder each having its own protective casing. The descriptions have all involved devices installed on bicycles. Appropriately skilled man can of course install the device on other types of vehicles.

What is claimed is:

1. A protective device for a bottle mounted in a holder or a cage fixed to a part of a cycle, comprising:

a cylindrical casing able to cover laterally, at least a top end of the bottle, and having a closed casing position and an open casing position;

a lid which is able to close a top end of the cylindrical casing, and comprising a pivoting device permitting an opening of the lid from a closed lid position, when the cylindrical casing is in the closed casing position, to an open lid position; and a sliding device disposable between the cage and the cycle wherein the cylindrical casing is able to have a sliding movement longitudinally along the sliding device, from the closed casing position where the top end of the bottle is protected to the open casing position thus giving access to the top end of the bottle.

2. Device according to claim 1, wherein the cylindrical casing includes a second sliding device able to cooperate with the first mentioned sliding device, allowing the cylindrical casing to slide between the open and closed casing positions.

3. Device according to claim 2, wherein the first mentioned sliding device comprises a U-shaped rail having a middle part and two lateral wings, the two lateral wings cooperating slidingly with the second sliding device disposed along the cylindrical casing.

4. Device according to claim 1, wherein the sliding movement of the cylindrical casing on the sliding device is limited by at least one stopping device.

5. Device according claim 1, wherein the lid comprises an overlapping portion situated in the plane of the lid and able to pivot around an axis perpendicular to the sliding movement of the cylindrical casing.

6. Device according to claim 5, wherein the lid comprises a first spring device able to close the lid.

7. Device according to claim 5 wherein the axis is positioned at an upper portion of the first sliding device.

8. Device according claim 1, wherein the movement of the cylindrical casing is independent from the movement of the lid.

9. Device according to claim 5, wherein the axis is positioned at a rear portion of the cylindrical casing.

10. Device according to claim 9, wherein the upper portion of the sliding device comprises a flipping device allowing for the opening of the lid.

11. Device according to claim 10, wherein the flipping device comprises an arch shaped portion, situated on an upper portion of the sliding device, able to cooperate into a gliding contact with a portion of an inner surface of the lid, for the opening of the lid.

12. Device according to claim 1, wherein the opening of the lid is controlled by the sliding movement of the cylindrical casing.

13. Device according to claim 9, wherein the opening of the lid is controlled by the sliding movement of the cylindrical casing.

14. Device according to claim 10, wherein the opening of the lid is controlled by the sliding movement of the cylindrical casing.

15. Device according to claim 9, wherein the sliding of the cylindrical casing is controlled by a second spring-device.

16. Device according to claim 14, further comprising a spring disposed adjacent to an upper portion of the sliding device wherein the spring biases the lid in the closed position.

17. Device according to claim 1 wherein the sliding movement of the cylindrical casing is controlled by the opening of the lid.

18. Device according to claim 15, wherein the sliding movement of the cylindrical casing is controlled by the opening of the lid.

19. Device according to claim 1, matable to an existing cage fixed to a portion of a cycle.

20. A cage for a bottle designed to be fixed to a cycle, comprising a protective device according to claim 1 attachable to the cage.

21. A cycle comprising at least one protective device according to claim 1 attachable to the cycle.

22. A cycle comprising a least one cage according to claim 20 attached to the cycle.

23. Device according to claim 3, wherein the middle part is fixable to a frame of the cycle.

24. Device according to claim 3, wherein the middle part is fixable to the cage.

25. Device according to claim 5, wherein the pivoting device is a hinge disposed along the axis.

26. A cage for holding a bottle and attachable to a cycle, comprising a protection device according to claim 1 and further comprising:

a fixing portion attachable to the cycle and integral with the sliding device of the protection device; and a clamp portion, wherein the fixing portion and the clamp portion are attached and adapted for receiving the bottle.

27. A cycle comprising a protection device according to claim 1 and further comprising:

a frame integral with the sliding device of the protection device.

* * * * *